United States Patent
Lee et al.

(10) Patent No.: US 12,210,425 B2
(45) Date of Patent: Jan. 28, 2025

(54) APPARATUS AND METHOD FOR PAGE ALLOCATION IN MANY-TO-ONE VIRTUALIZATION ENVIRONMENT

(71) Applicant: ELECTRONICS AND TELECOMMUNICATIONS RESEARCH INSTITUTE, Daejeon (KR)

(72) Inventors: Sang-Min Lee, Daejeon (KR); Hong-Yeon Kim, Daejeon (KR); Baik-Song An, Daejeon (KR); Myung-Hoon Cha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 53 days.

(21) Appl. No.: 18/057,071

(22) Filed: Nov. 18, 2022

(65) Prior Publication Data

US 2023/0168977 A1   Jun. 1, 2023

(30) Foreign Application Priority Data

Nov. 29, 2021   (KR) .................. 10-2021-0166746

(51) Int. Cl.
*G06F 11/14* (2006.01)
*G06F 9/455* (2018.01)
(Continued)

(52) U.S. Cl.
CPC ...... *G06F 11/1484* (2013.01); *G06F 11/0772* (2013.01); *G06F 11/079* (2013.01);
(Continued)

(58) Field of Classification Search
CPC ............. G06F 11/1484; G06F 11/0772; G06F 11/079; G06F 12/08–0897;
(Continued)

(56) References Cited

U.S. PATENT DOCUMENTS 6,711,632 B1 * 3/2004 Chow ................ G06F 12/0804
710/48
7,702,743 B1 * 4/2010 Wong ................ G06F 12/0284
709/216
(Continued)

OTHER PUBLICATIONS

Wikipedia Article, "Page fault", retrieved from https://en.wikipedia.org/w/index.php?title=Page_fault&oldid=1111899541 on Dec. 6, 2023, published Sep. 23, 2022, pp. 1-3 (Year: 2022).*
(Continued)

*Primary Examiner* — Gabriel Chu
*Assistant Examiner* — Indranil Chowdhury (57) ABSTRACT

Disclosed herein are an apparatus and method for page allocation in a many-to-one virtualization environment. The method may include determining whether a page fault interrupt is caused by page initialization for page allocation, sending an ownership change message to a node having ownership of the corresponding page when the page fault interrupt is determined to be caused by page initialization, and initializing the corresponding page upon receiving an ownership-change-processing-complete message.

12 Claims, 8 Drawing Sheets

(51) Int. Cl.
    *G06F 11/07*     (2006.01)
    *G06F 12/02*     (2006.01)
    *G06F 12/08*     (2016.01)

(52) U.S. Cl.
    CPC ............ *G06F 12/023* (2013.01); *G06F 12/08* (2013.01); *G06F 2009/45583* (2013.01)

(58) Field of Classification Search
    CPC .......... G06F 12/023–0292; G06F 2009/45562; G06F 2009/4557; G06F 2009/45575; G06F 2009/45583
    See application file for complete search history.

(56) References Cited

U.S. PATENT DOCUMENTS

| | | | |
|---|---|---|---|
| 8,307,191 | B1 | 11/2012 | Jain |
| 9,798,482 | B1* | 10/2017 | Tsirkin .................. G06F 3/0604 |
| 2005/0132249 | A1* | 6/2005 | Burton ................ G06F 11/2097 |
| | | | 711/170 |
| 2005/0273571 | A1* | 12/2005 | Lyon ................... G06F 9/45537 |
| | | | 711/203 |
| 2012/0005431 | A1 | 1/2012 | Gross |
| 2015/0199209 | A1* | 7/2015 | Tsirkin .................. G06F 9/5016 |
| | | | 718/1 |
| 2017/0149921 | A1* | 5/2017 | Nassi .................. H04L 67/2885 |
| 2020/0042338 | A1* | 2/2020 | Poothia ................. G06F 12/023 |
| 2020/0174817 | A1 | 6/2020 | Ding |
| 2020/0344305 | A1* | 10/2020 | Lee ..................... G06F 9/45558 |
| 2021/0374071 | A1* | 12/2021 | Annapareddy ......... G06F 12/08 |
| 2022/0147462 | A1* | 5/2022 | An .......................... G06F 12/08 |
| 2022/0358049 | A1* | 11/2022 | Tsirkin ................ G06F 13/4221 |
| 2023/0004502 | A1* | 1/2023 | Akel ....................... G06F 9/546 |
| 2024/0160353 | A1* | 5/2024 | Patel ..................... G06F 9/4411 |
| 2024/0202122 | A1* | 6/2024 | Cully .................. G06F 12/0815 |

OTHER PUBLICATIONS

S. Jin, J. Ahn, S. Cha and J. Huh, "Architectural support for secure virtualization under a vulnerable hypervisor," 2011 44th Annual IEEE/ACM International Symposium on Microarchitecture (MICRO), Porto Alegre, Brazil, 2011, pp. 272-283. (Year: 2011).*

Jin Zhang et al., "GiantVM: A Type-II Hypervisor Implementing Many-to-one Virtualization," VEE '20: Proceedings of the 16th ACM SIGPLAN/SIGOPS International Conference on Virtual Execution Environments, 2020.

* cited by examiner

APPARATUS AND METHOD FOR PAGE ALLOCATION IN MANY-TO-ONE VIRTUALIZATION ENVIRONMENT

CROSS REFERENCE TO RELATED APPLICATION

This application claims the benefit of Korean Patent Application No. 10-2021-0166746, filed Nov. 29, 2021, which is hereby incorporated by reference in its entirety into this application.

BACKGROUND OF THE INVENTION

1. Technical Field

The disclosed embodiment relates generally to a many-to-one virtualization environment, and more particularly to technology for optimizing page-allocation processing.

2. Description of the Related Art

Unlike existing one-to-many virtualization technology, which provides a number of independent virtual regions in a single server, many-to-one virtualization technology is technology for providing a single system image using multiple servers. Accordingly, many inexpensive servers are purchased and grouped using many-to-one virtualization technology so as to be used as a single high-performance server, rather than adopting a single expensive server having high performance.

In the case of many-to-one virtualization technology, multiple individual nodes respectively execute a hyper kernel, whereby the same single system image is provided to the multiple individual nodes. However, because the memory devices of the multiple nodes are physically separate from each other, when a memory region in any one node is changed, the change is not visible to the other nodes.

In order to solve this problem, many-to-one virtualization technology requires a Distributed Shared Memory (DSM) system. Using a DSM system, a changed value in the memory region of any one node appears immediately at the other nodes, whereby the same effect as if a single memory system were being used may be obtained.

However, such a DSM system incurs expenses in order to maintain consistency of a page.

First, in order for a node to write to a certain page, it is necessary to fetch data thereof by making a request to the node having the page. Then, the node receiving the request for the page deletes the page from a page table in order to prevent the page from changing any further. Then, the data of the page, deleted from the page table (that is, the page guaranteed not to change), is read and transferred to the node requesting the page over a network.

Due to such consistency maintenance expense, the performance of a many-to-one virtualization system is significantly degraded. This is because high access latency is caused by the use of an externally connected network device compared with a single system in which access is made using hardware connected via an internal system bus. Accordingly, a many-to-one virtualization system necessarily provides much lower performance than a single high-performance system. Particularly, when connection is made using low-cost network devices, the performance degradation may become severe.

SUMMARY OF THE INVENTION

An object of the disclosed embodiment is to optimize a Distributed Shared Memory (DSM) system of a many-to-one virtualization system, thereby enabling a page to be shared with high performance at low cost.

Another object of the present invention is to minimize processing time when memory allocation is processed in a many-to-one virtualization environment, thereby optimizing performance.

A method for page allocation in a many-to-one virtualization environment according to an embodiment may include determining whether a page fault interrupt is caused by page initialization for page allocation, sending an ownership change message to a node having ownership of a corresponding page when the page fault interrupt is determined to be caused by page initialization, and initializing the corresponding page upon receiving an ownership-change-processing-complete message.

Here, the method may further include registering the execution address of a page initialization function of a guest operating system (OS) before determining whether the page fault interrupt is caused by page initialization.

Here, registering the execution address may include receiving the page initialization function and the execution address acquired by the guest OS; and setting settings information of a clear page structure to 'TRUE' and registering the execution address as an Instruction Pointer (IP).

Here, determining whether the page fault interrupt is caused by page initialization may include acquiring the address of an instruction causing the page fault interrupt, comparing the address of the instruction with the execution address stored in the IP when the settings information of the clear page structure is 'TRUE', and determining whether the page fault interrupt is triggered by a change in a page table when the address of the instruction is identical to the execution address stored in the IP.

The method may further include allocating a page before sending the ownership change message, and sending the ownership change message may comprise requesting acquisition of the ownership of the corresponding page.

A method for page allocation in a many-to-one virtualization environment according to an embodiment may include receiving a message for changing ownership of a predetermined page from an additional node and loading information about the page; sending an ownership-change-processing-complete message; and processing change of the ownership. Sending the ownership-change-processing-complete message and processing the change of the ownership may be simultaneously performed.

Here, processing the change of the ownership may include setting a lock on the page, deleting the page from a page table, and setting the ownership of the page to the additional node.

An apparatus for page allocation in a many-to-one virtualization environment according to an embodiment may include memory in which at least one program is recorded and a processor for executing the program. The program may perform determining whether a page fault interrupt is caused by page initialization for page allocation, sending an ownership change message to a node having ownership of a corresponding page when the page fault interrupt is determined to be caused by page initialization, and initializing the corresponding page upon receiving an ownership-change-processing-complete message.

Here, the program may further perform registering the execution address of a page initialization function of a guest operating system (OS) before determining whether the page fault interrupt is caused by page initialization.

Here, when registering the execution address, the program may perform receiving the page initialization function and the execution address acquired by the guest OS; and setting settings information of a clear page structure to 'TRUE' and registering the execution address as an Instruction Pointer (IP).

Here, when determining whether the page fault interrupt is caused by page initialization, the program may perform acquiring the address of an instruction causing the page fault interrupt, comparing the address of the instruction with the execution address stored in the IP when the settings information of the clear page structure is 'TRUE, and determining whether the page fault interrupt is triggered by a change in a page table when the address of the instruction is identical to the execution address stored in the IP.

Here, the program may perform allocating a page before sending the ownership change message, and when sending the ownership change message, the program may request acquisition of the ownership of the corresponding page.

Here, the program may perform receiving a message for changing ownership of a predetermined page from an additional node and loading information about the page; sending an ownership-change-processing-complete message; and processing change of the ownership. The program may simultaneously perform sending the ownership-change-processing-complete message and processing the change of the ownership.

Here, when processing the change of the ownership, the program may perform setting a lock on the page, deleting the page from a page table, and setting the ownership of the page to the additional node.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method for page allocation in a many-to-one virtualization environment according to an embodiment will be described in detail with reference to FIGS. 1 to 9.

Figure 1:
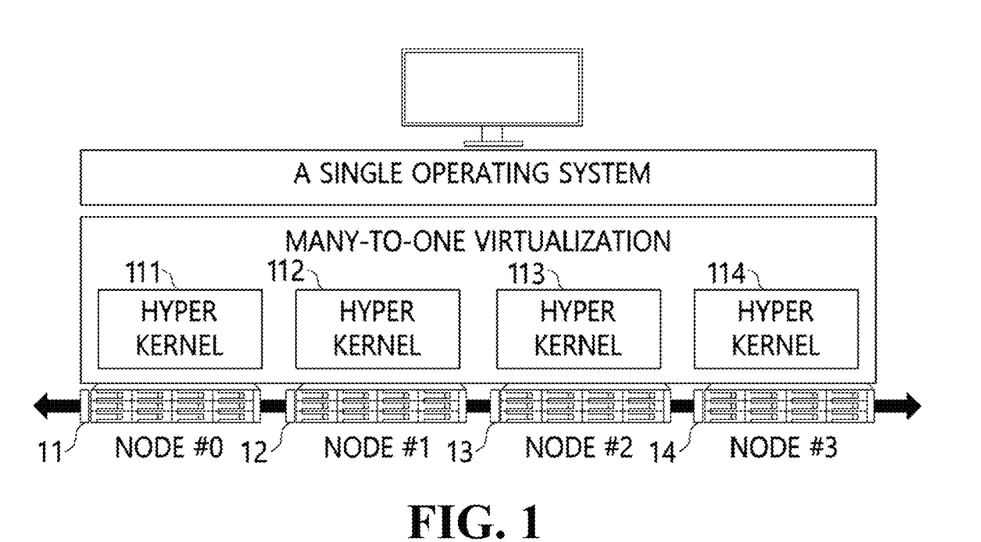
FIG. 1 is a concept diagram of general many-to-one virtualization technology.

FIG. 1 is a concept diagram of general many-to-one virtualization technology.

Referring to FIG. 1, hyper kernels 111, 112, 113, and 114 are respectively installed in individual nodes 11, 12, 13, and 14 in order to provide a many-to-one virtualization environment, whereby the individual nodes 11, 12, 13, and 14 are provided with an environment in which they operate as if they were part of an operating system (OS) on a single server.

However, in order to integrate the physically separated individual nodes 11, 12, 13, and 14 so as to appear to be a single system, a Distributed Shared Memory (DSM) system is required. Through such a DSM system, a memory region changed in any one node is immediately reflected to the other nodes, whereby a single memory space may be provided.

Figure 2:
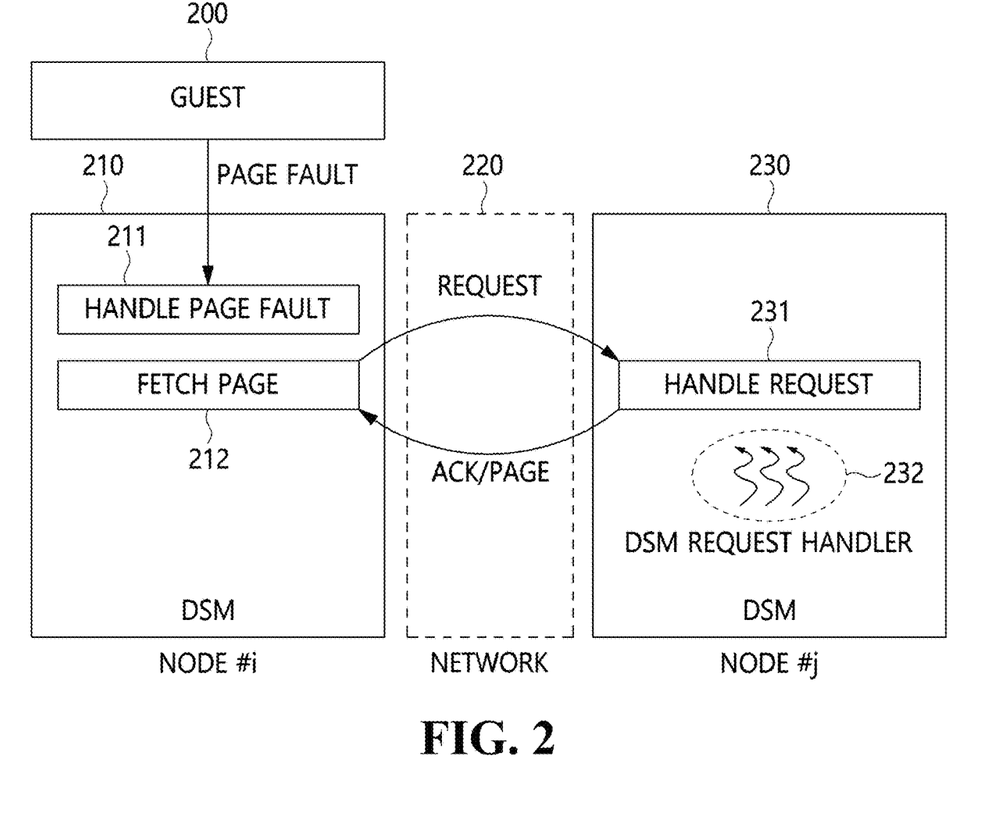
FIG. 2 is an exemplary view of an operation for consistency control processing in a general distributed shared memory system.

FIG. 2 is an exemplary view of an operation for consistency control processing in a general DSM system.

Referring to FIG. 2, when a guest OS 200 accesses a memory page (e.g., a page of 4 Kbytes), if it has no ownership of the corresponding page, a page fault interrupt occurs.

In order to handle the page fault (211), a DSM 210 fetches the page (212) from the DSM 230 of the node having ownership of the corresponding page.

Specifically, the DSM 210 requests the page from the DSM 230 over a network 220, and the DSM 230 makes a DSM request handler 232 delete the page from a page table, reads page data, and transfers the same to the DSM 210 (ACK/PAGE) in order to handle the request (231).

Meanwhile, a guest OS running in a many-to-one virtualization server frequently performs page allocation in response to requests for memory allocation from applications. However, because the guest OS processes page allocation as shown in FIG. 3, a long processing time is consumed.

Figure 3:
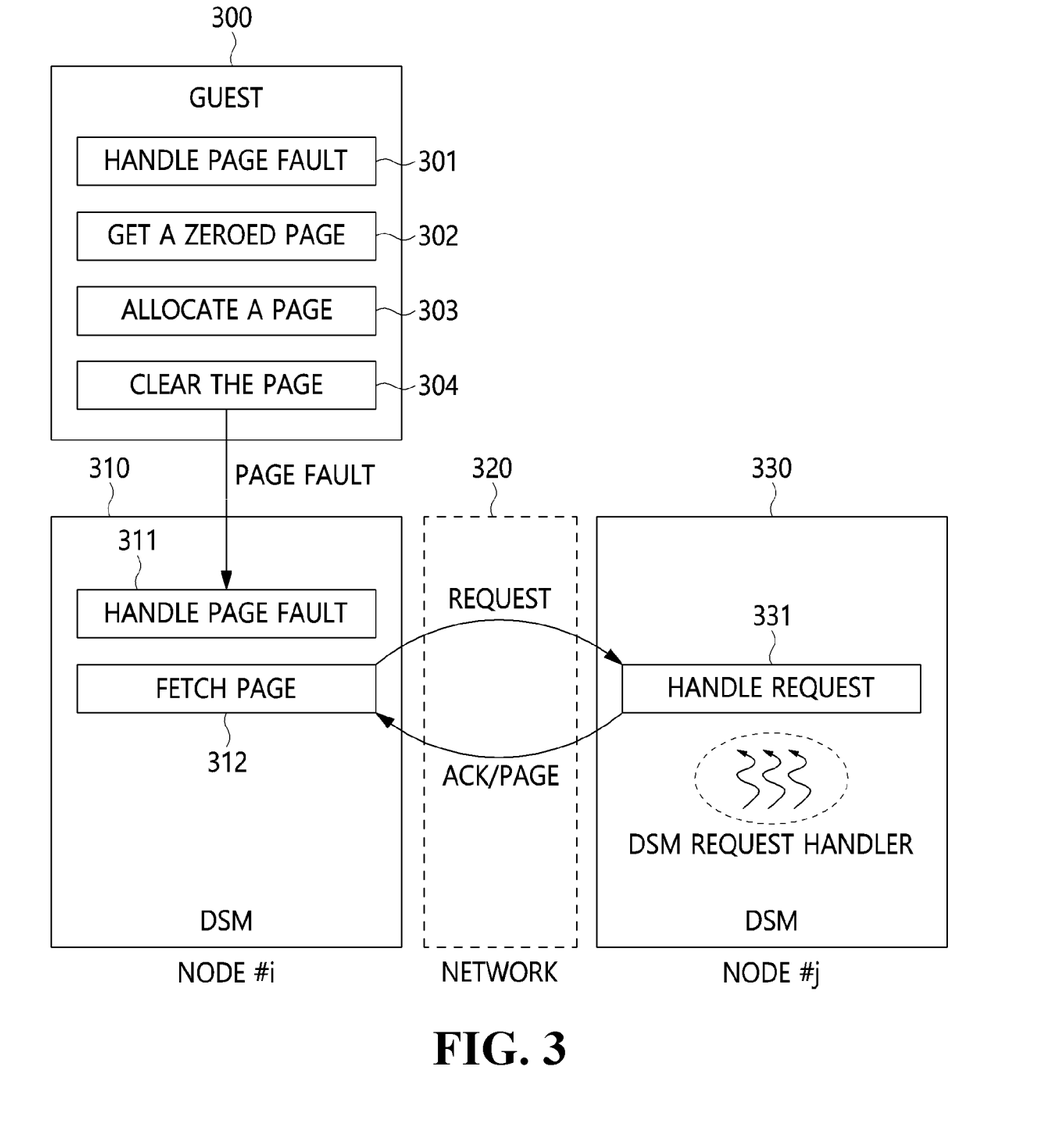
FIG. 3 is an exemplary view of an operation for processing a request for memory allocation in a many-to-one virtualization environment when the request is made by an application.

FIG. 3 is an exemplary view of an operation for processing a request for memory allocation in a many-to-one virtualization environment when the request is made by an application.

Referring to FIG. 3, when a guest OS 300 allocates a page (303) and accesses memory in order to clear the page (304), it receives a page fault interrupt from a hyper kernel.

In order to handle the page fault (311), a DSM 310 fetches the page (312) from the DSM 330 of the node having ownership of the page.

Specifically, the DSM 310 requests the page from the DSM 330 over a network 320, and the DSM 330 makes a DSM request handler 332 delete the page from a page table, reads page data, and transfers the same to the DSM 310 (ACK/PAGE) in order to handle the request (331).

Finally, after page fault handling (311) is completed, the guest OS 300 initializes the allocated page by zeroing the same (302).

As described above, the existing method of handling a memory allocation request in a many-to-one virtualization environment is very complex, and a lot of expense is consumed for page consistency processing in a DSM system. Also, after memory page allocation, data acquired at high cost is not used at all, and the space containing the same is initialized.

Accordingly, in order to solve the problem of a long processing time caused when memory allocation is processed as described above, an embodiment enables the ownership of a page to be acquired from the node having the ownership of the page when page consistency processing is performed (that is, when a page fault is handled), thereby minimizing the processing time and optimizing performance.

Figure 4:
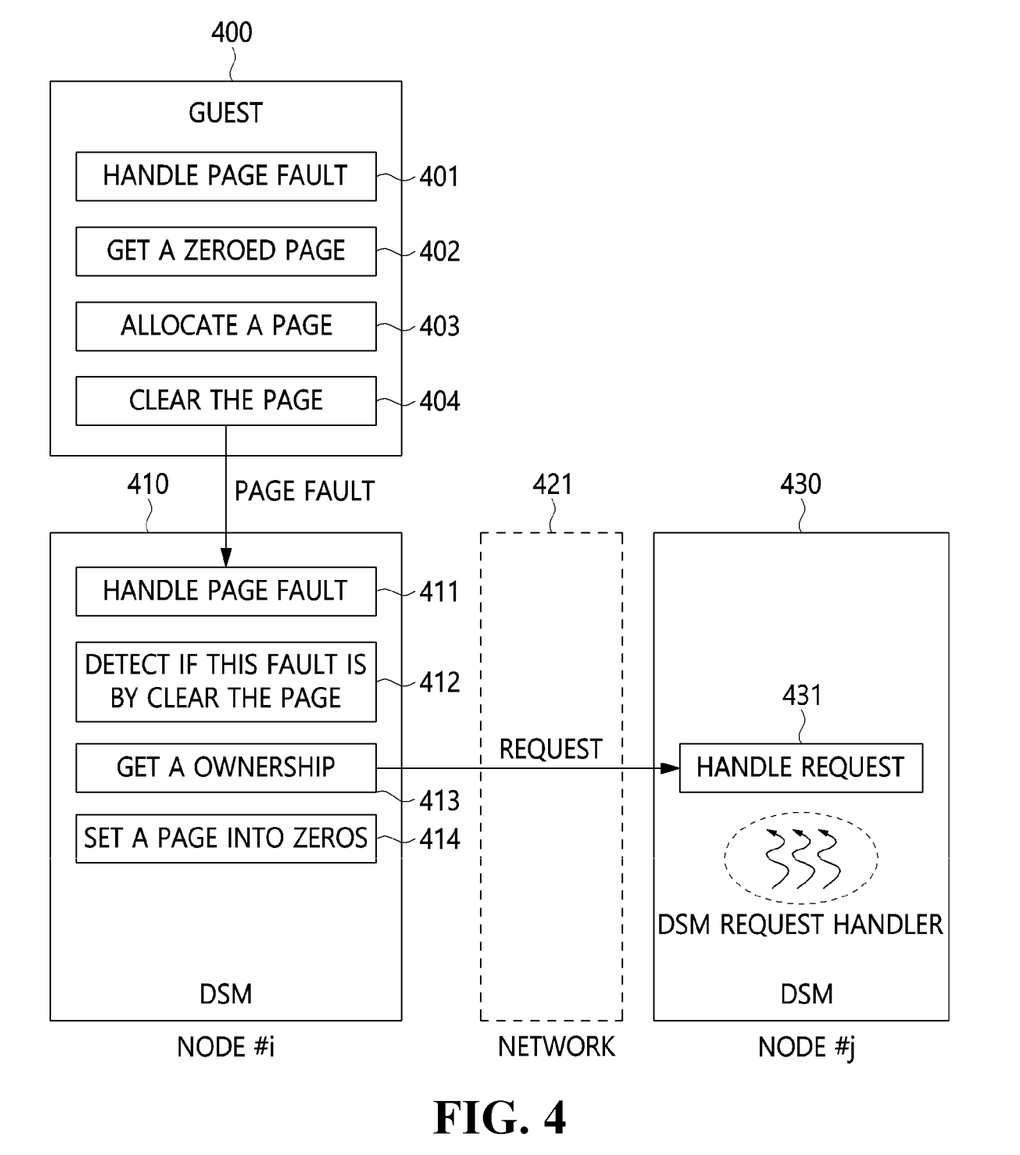
FIG. 4 is a view for explaining a method for memory allocation in a many-to-one virtualization environment according to an embodiment.

FIG. 4 is a view for explaining a method for page allocation in a many-to-one virtualization environment according to an embodiment.

Referring to FIG. 4, in order to handle a page fault interrupt (411) in the method for page allocation in a many-to-one virtualization environment according to an embodiment, whether the page fault interrupt is caused by page initialization (clearing a page) for page allocation is determined (412).

When the page fault interrupt is determined to be caused by page initialization, a DSM 410 acquires ownership of the page from the DSM 430 of the node having the ownership of the page (413). Here, the DSM 410 merely sends an ownership change message to the DSM 430 of the node having the ownership of the page (421).

Upon receiving an ownership-change-processing-complete message, the DSM 410 initializes the page (414).

Meanwhile, according to an embodiment, in order to determine whether the page fault interrupt is caused by page initialization (by clearing the page) for page allocation, the execution address of the page initialization function of a guest OS is required to be registered in advance.

Figure 5:
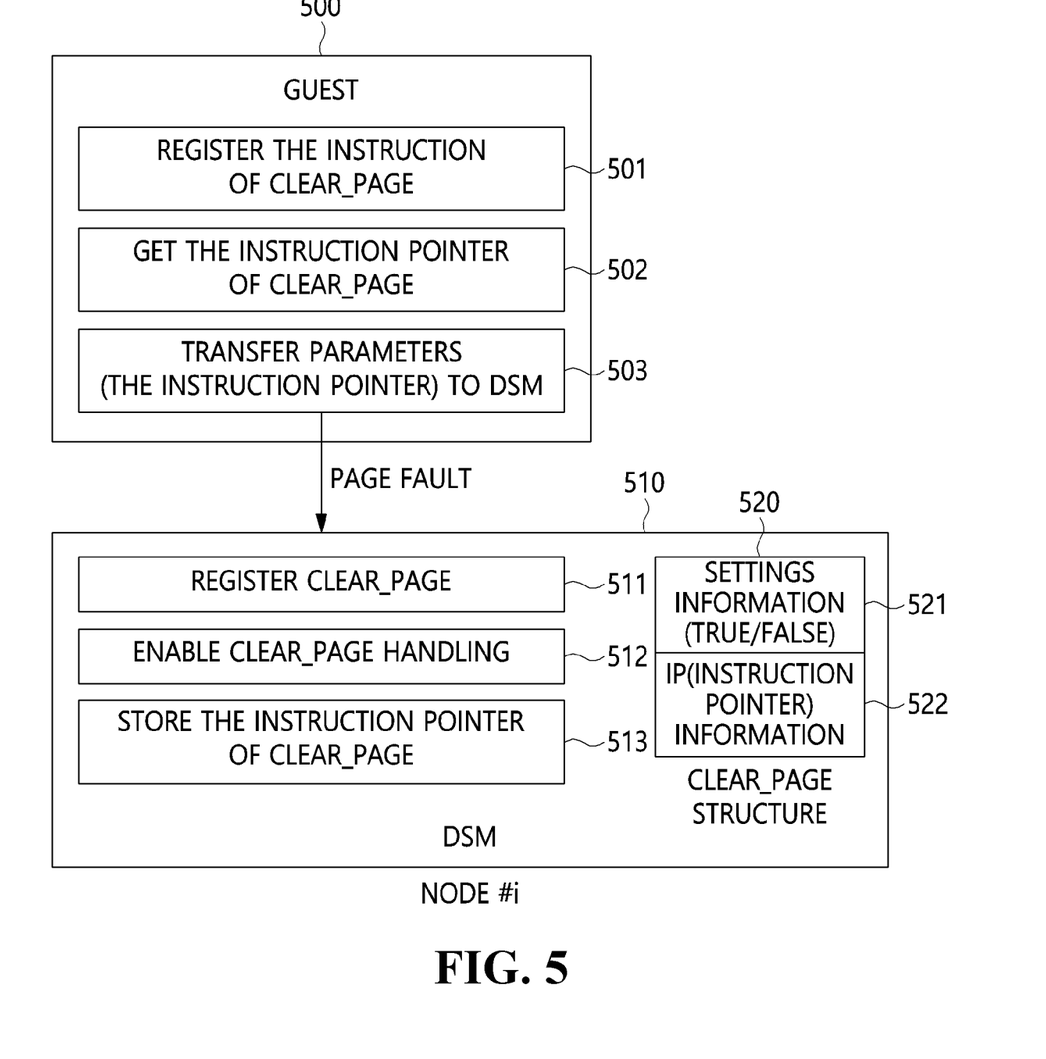
FIG. 5 is a view for explaining advance registration required for determining page initialization (clearing of a page) according to an embodiment.

FIG. 5 is a view for explaining advance registration required for determining page initialization (clearing of a page) according to an embodiment.

Referring to FIG. 5, the execution address of a page initialization function (clear_page function) of a guest OS 500 is registered (501, 511).

First, the guest OS 500 acquires the execution address of the clear_page function from a symbolic table (502) and transfers the same to the DSM 510 of a hyper kernel (503).

The DSM 510 registers the execution address in a clear_page structure 520 (511, 512, 513).

Here, the clear_page structure 520 may include settings information 521 and Instruction Pointer (IP) information 522.

Here, the settings information 521 is set to 'TRUE' or 'FALSE' depending on whether a page fault interrupt is caused by page initialization (clear_page) for page allocation. Also, the execution address of the clear_page function is registered as the IP information 522.

Figure 6:
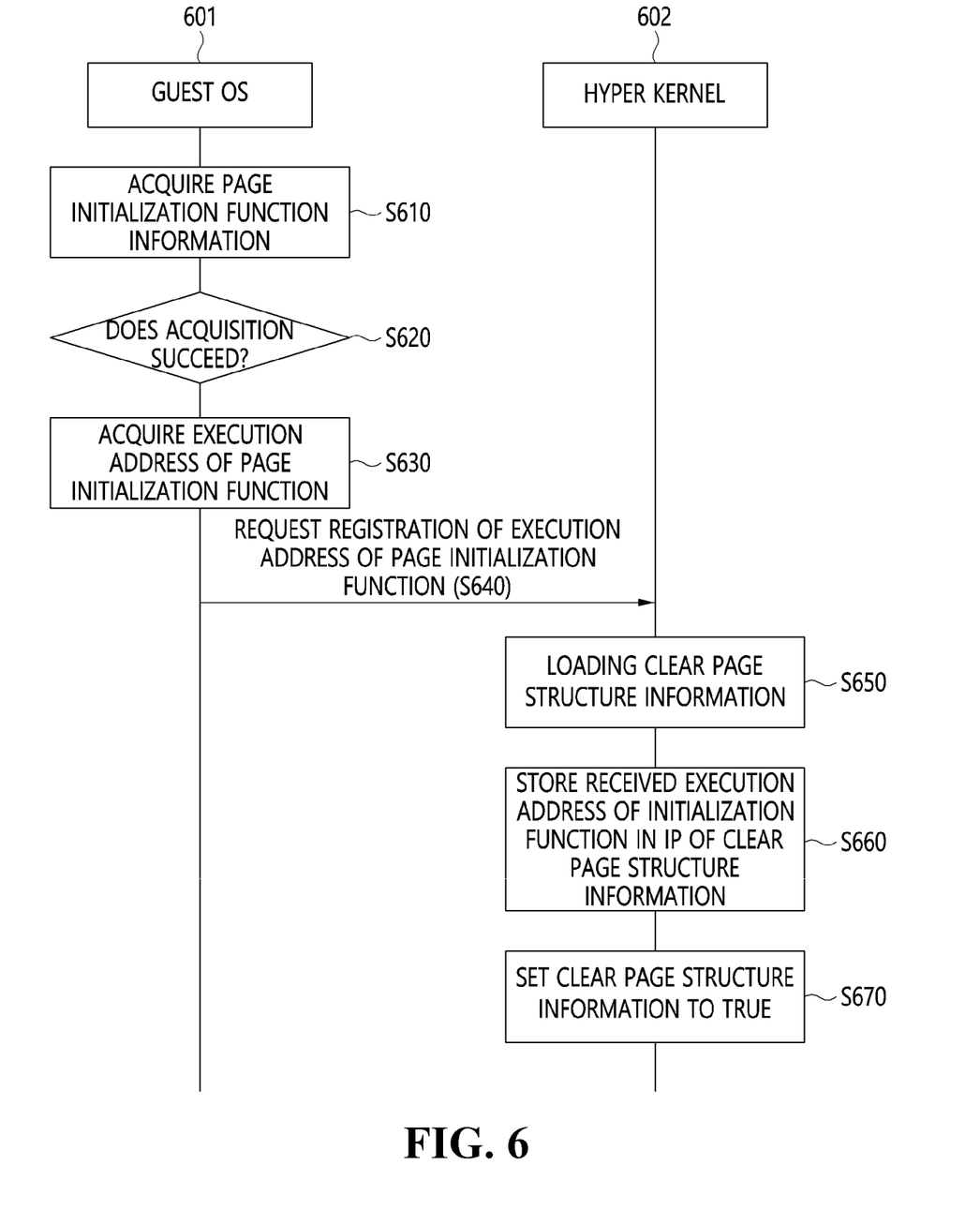
FIG. 6 is a signal flowchart for explaining registration of the execution address of a page initialization function of a guest operating system according to an embodiment.

FIG. 6 is a signal flowchart for explaining registration of the execution address of a page initialization function of a guest OS according to an embodiment.

Referring to FIG. 6, a guest OS 601 acquires information about a page initialization function (clear_page function) at step S610.

Subsequently, the guest OS 601 determines whether the information about the page initialization function is successfully acquired at step S620.

When it is determined at step S620 that the information is successfully acquired, the guest OS 601 acquires the execution address of the page initialization function at step S630.

Subsequently, the guest OS 601 requests a hyper kernel 602 to register the execution address of the page initialization function at step S640.

The DSM system of the hyper kernel 602 loads information about a clear page structure at step S650, sets the value of an Instruction Pointer (IP) in the clear page structure to the execution address at step S660, and changes settings information to 'TRUE' at step S670, whereby, when a page fault is caused by page initialization, the page fault may be handled.

Figure 7:
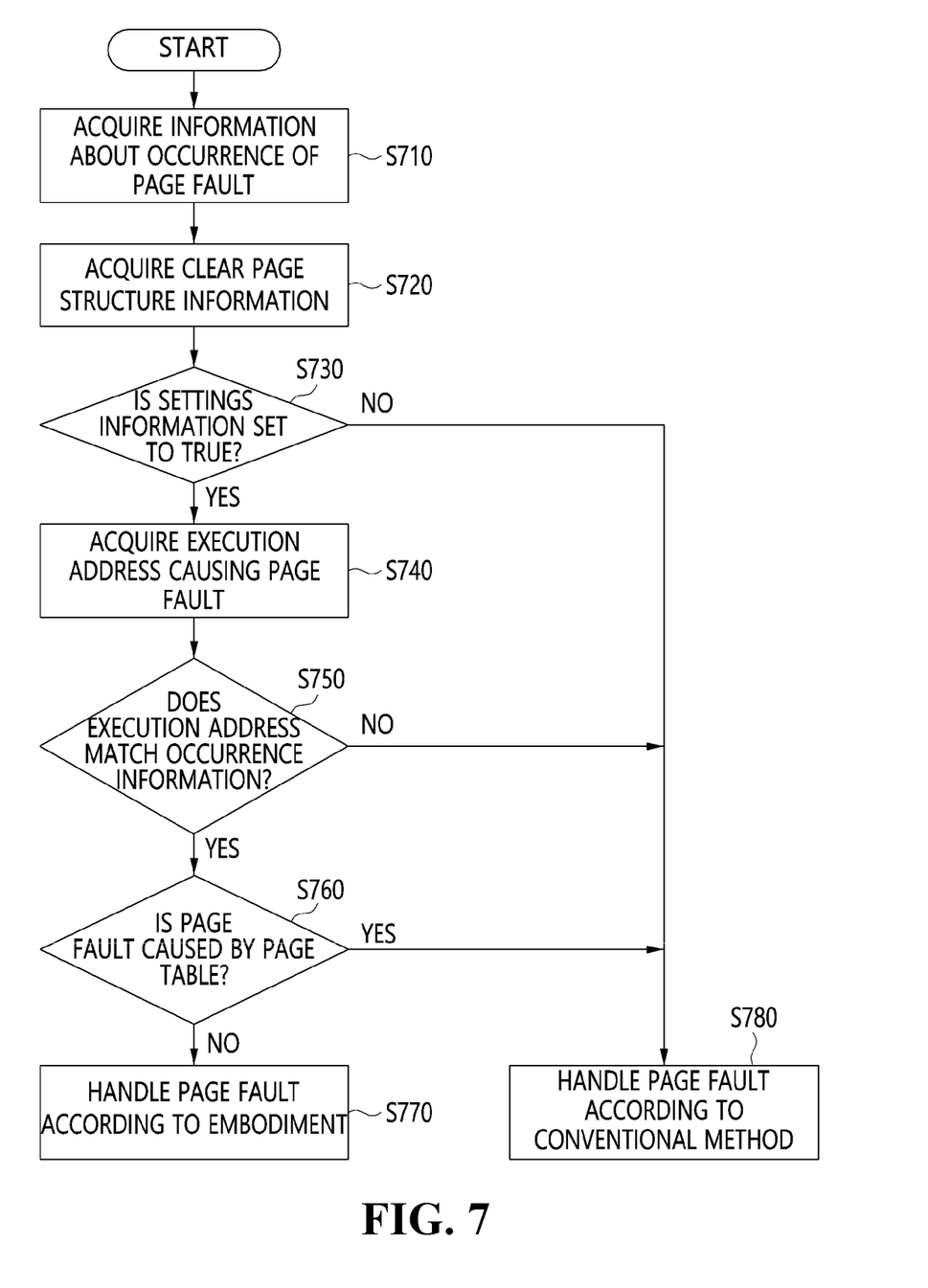
FIG. 7 is a flowchart for explaining a determination as to whether a page fault interrupt is caused by page initialization for page allocation according to an embodiment.

FIG. 7 is a flowchart for explaining a determination as to whether a page fault interrupt is caused by page initialization for page allocation according to an embodiment.

Referring to FIG. 7, when a page fault interrupt occurs in a hyper kernel, a DSM acquires the address of the instruction causing the page fault interrupt at step S710.

Subsequently, the DSM acquires clear page structure information at step S720 and checks whether the settings information therein is 'TRUE' at step S730.

When it is determined at step S730 that the settings information is 'TRUE', the DSM acquires the execution address stored in the IP of the clear page structure information at step S740.

Subsequently, the DSM determines whether the address of the instruction is the same as the execution address at step S750.

When it is determined at step S750 that the address of the instruction is the same as the execution address, the DSM determines whether the page fault interrupt is triggered by a page table at step S760.

When it is determined at step S760 that the page fault interrupt is not triggered by a page table, the DSM handles the page fault according to an embodiment at step S770.

Conversely, when it is determined at step S730 that the settings information is not 'TRUE', when it is determined at step S750 that the address of the instruction is not the same as the execution address, or when it is determined at step S760 that the page fault interrupt is triggered by the page table, it is determined that the page fault interrupt was not caused by page initialization, so conventional page fault handling is performed at step S780.

Figure 8:
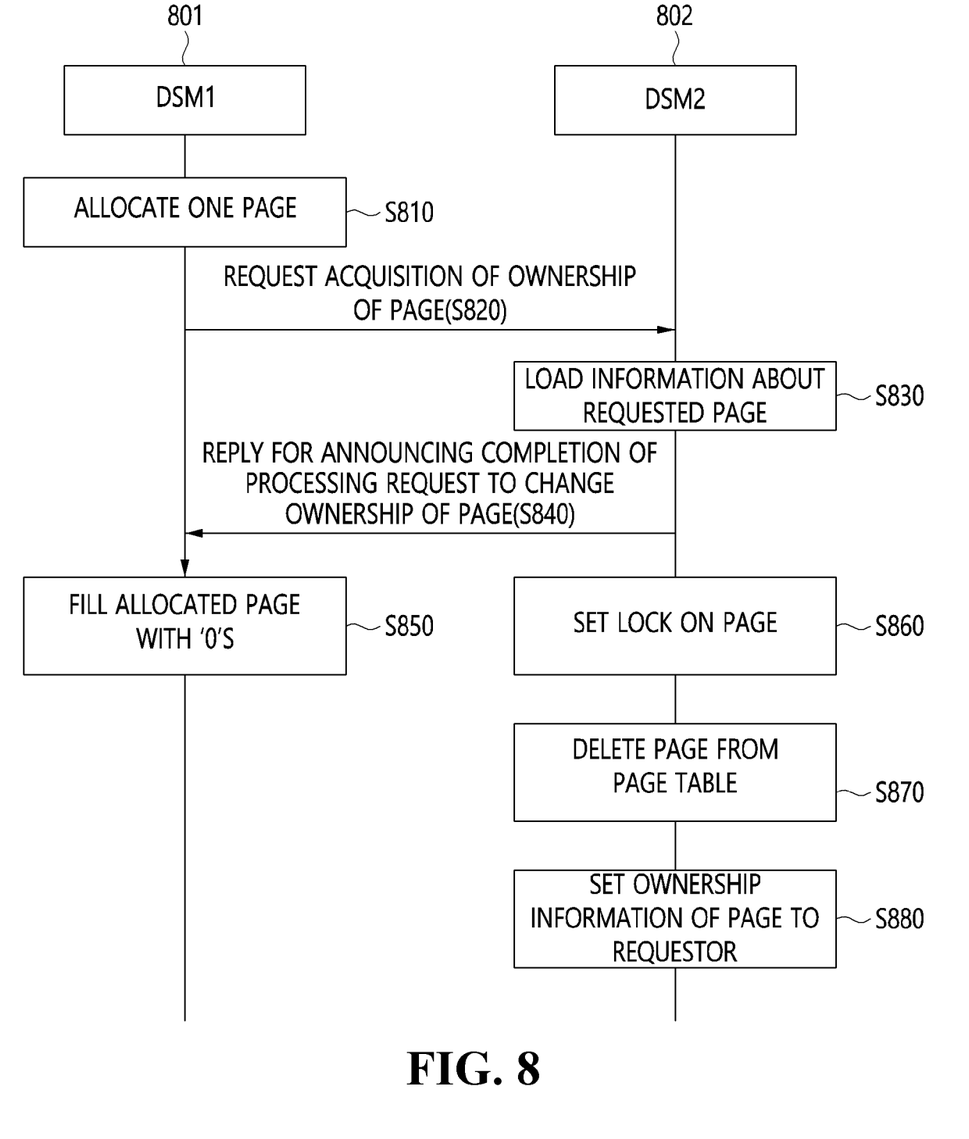
FIG. 8 is a signal flowchart for explaining page fault handling according to an embodiment.

FIG. 8 is a signal flowchart for explaining page fault handling according to an embodiment.

Referring to FIG. 8, DSM1 801 of a node for handling a page fault allocates a single page at step S810 and requests ownership of the page from DSM2 802 of the node having the ownership of the page at step 820.

Upon receiving a message for requesting a change in the ownership of the page from DSM1 801, DSM2 802 loads information about the page at step S830 and immediately sends an ownership-change-processing-complete message to DSM1 801 at step S840. That is, because the ownership-change-processing-complete message is sent immediately, page fault handling may be quickly performed by DSM1 801.

Then, DSM1 801 may quickly initialize the allocated page to '0' at step S850.

Meanwhile, simultaneously with sending the ownership-change-processing-complete message, DSM2 802 performs the following process in order to handle the request to change the ownership. That is, DSM2 802 sets a lock on the page for consistency control at step S860 and deletes the page from a page table at step S870, after which ownership of the page may be set to the node that made the request at step S880.

Figure 9:
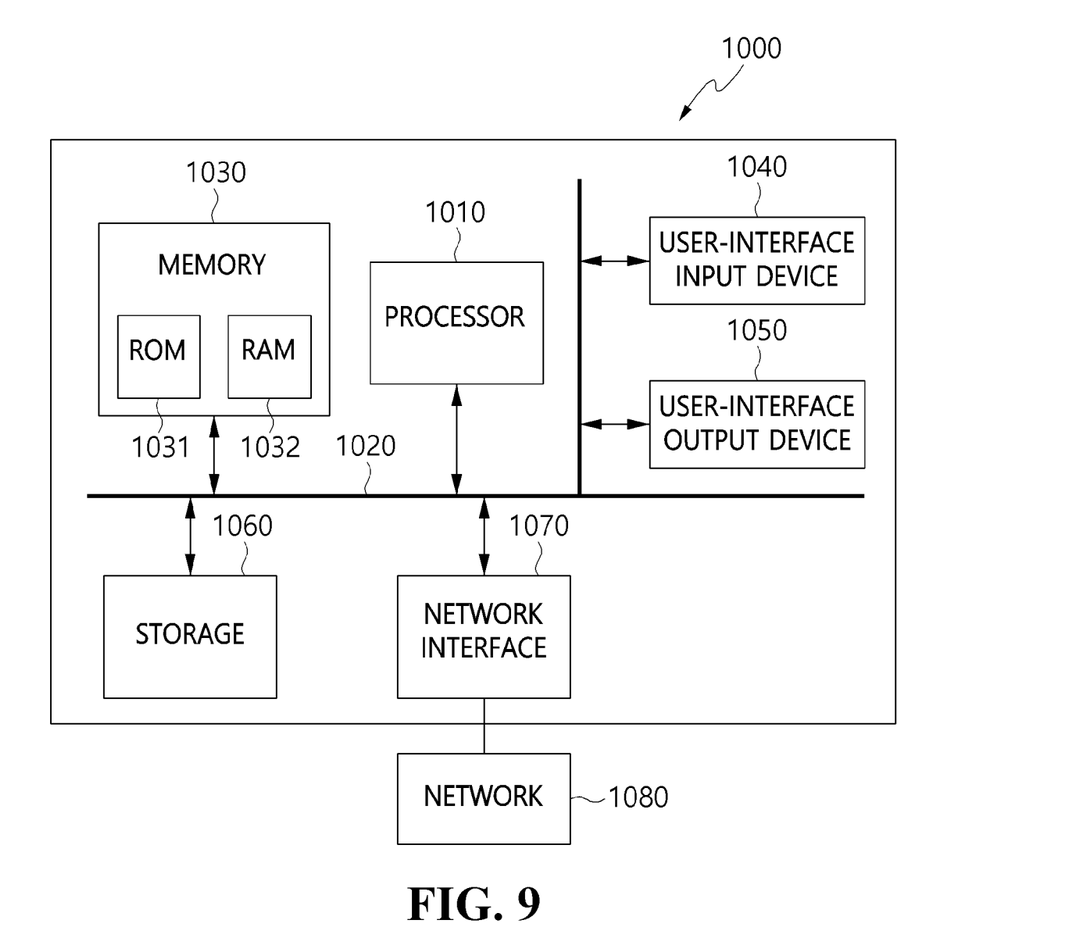
FIG. 9 is a view illustrating a computer system configuration according to an embodiment.

FIG. 9 is a view illustrating a computer system configuration according to an embodiment.

The apparatus for page allocation in a many-to-one virtualization environment according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a nonvolatile medium, a detachable medium, a non-detachable medium, a communication medium, and an information delivery medium. For example, the memory 1030 may include ROM 1031 or RAM 1032.

According to the disclosed embodiment, in order to improve the performance of many-to-one virtualization technology, allocation of a page that is frequently called may be optimized.

According to the disclosed embodiment, when optimization of page allocation is applied to an existing many-to-one virtualization environment, a greater number of tasks can be processed than with the conventional art thanks to improvement in the performance of applications, and the adoption of many-to-one virtualization technology may be expanded.

Although embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. A method for page allocation in a many-to-one virtualization environment, the method comprising:
    determining whether a page fault interrupt is caused by a page initialization for page allocation of a corresponding page;
    sending an ownership change message to a node having an ownership of the corresponding page in response to determining that the page fault interrupt is caused by the page initialization; and
    initializing the corresponding page upon receiving an ownership-change-processing-complete message.

2. The method of claim 1, further comprising:
    registering an execution address of a page initialization function of a guest operating system (OS) before determining whether the page fault interrupt is caused by the page initialization,
    wherein determining whether the page fault interrupt is caused by the page initialization includes using the execution address that has been registered to determine whether the page fault interrupt is caused by the page initialization.

3. The method of claim 2, wherein registering the execution address includes:
    receiving the page initialization function and the execution address acquired by the guest OS; and
    setting settings information of a clear page structure to 'TRUE' and registering the execution address as an Instruction Pointer (IP).

4. The method of claim 3, wherein determining whether the page fault interrupt is caused by the page initialization includes:
    acquiring an address of an instruction causing the page fault interrupt;
    comparing the address of the instruction with the execution address stored in the IP when the settings information of the clear page structure is 'TRUE'; and
    determining whether the page fault interrupt is triggered by a change in a page table when the address of the instruction is identical to the execution address stored in the IP.

5. The method of claim 4, further comprising:
    allocating a page before sending the ownership change message,
    wherein sending the ownership change message comprises requesting acquisition of the ownership of the corresponding page.

6. An apparatus for page allocation in a many-to-one virtualization environment, the apparatus comprising:
    memory in which at least one program is recorded; and
    a processor for executing the program,
    wherein the program performs;
        determining whether a page fault interrupt is caused by a page initialization for page allocation of a corresponding page,
        sending an ownership change message to a node having an ownership of the corresponding page in response to determining that the page fault interrupt is caused by the page initialization, and
        initializing the corresponding page upon receiving a first ownership-change-processing-complete message.

7. The apparatus of claim 6, wherein the program further performs
registering an execution address of a page initialization function of a guest operating system (OS) before determining whether the page fault interrupt is caused by the page initialization,
wherein determining whether the page fault interrupt is caused by the page initialization includes using the execution address that has been registered to determine whether the page fault interrupt is caused by the page initialization.

8. The apparatus of claim 7, wherein, when registering the execution address, the program performs
receiving the page initialization function and the execution address acquired by the guest OS; and
setting settings information of a clear page structure to 'TRUE' and registering the execution address as an Instruction Pointer (IP).

9. The apparatus of claim 8, wherein, when determining whether the page fault interrupt is caused by the page initialization, the program performs
acquiring an address of an instruction causing the page fault interrupt;
comparing the address of the instruction with the execution address stored in the IP when the settings information of the clear page structure is 'TRUE; and
determining whether the page fault interrupt is triggered by a change in a page table when the address of the instruction is identical to the execution address stored in the IP.

10. The apparatus of claim 9, wherein:
the program performs allocating a page before sending the ownership change message, and
when sending the ownership change message, the program requests acquisition of the ownership of the corresponding page.

11. The apparatus of claim 6, wherein the program performs;
receiving a message for changing an ownership of a specified page from an additional node and loading information about the specified page;
sending a second ownership-change-processing-complete message; and
processing change of the ownership of the specified page, and
wherein the program simultaneously performs sending the second ownership-change-processing-complete message and processing the change of the ownership of the specified page.

12. The apparatus of claim 11, wherein, when processing the change of the ownership of the specified page, the program performs:
setting a lock on the specified page;
deleting the specified page from a page table; and
setting the ownership of the specified page to the additional node.

* * * * *